Patented May 31, 1932

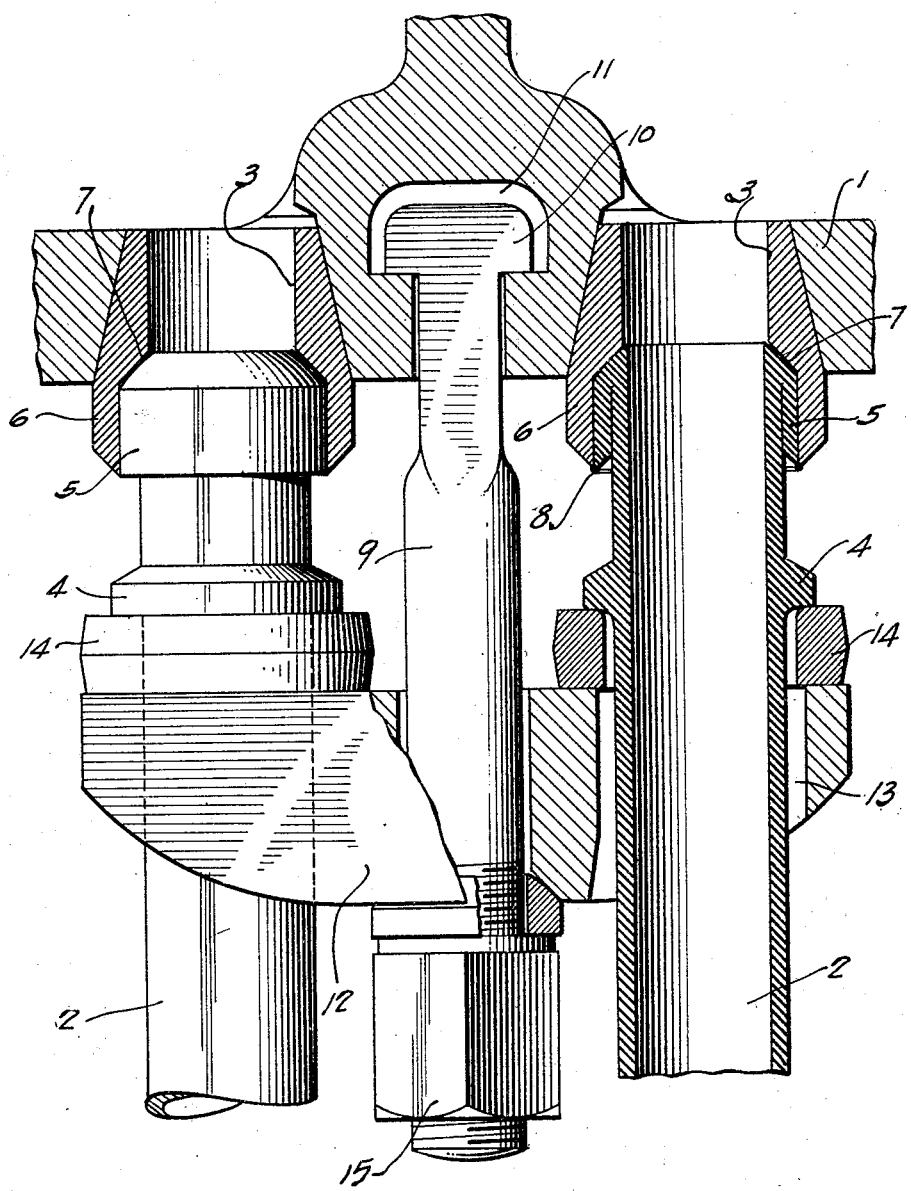

1,860,969

UNITED STATES PATENT OFFICE

CHARLES H. TRUE, OF CHICAGO, ILLINOIS, ASSIGNOR TO THE SUPERHEATER COMPANY, OF NEW YORK, N. Y.

PIPE AND HEADER JOINT

Application filed September 10, 1929. Serial No. 391,626.

This invention relates to means for securing pipes to walls such for example as tubular superheater elements or units to the superheater headers. Its purpose is to provide more satisfactory means of this kind than have been available heretofore.

The invention is illustrated in the drawing herewith.

Referring to this drawing, a portion of the wall of a superheater header is shown at 1. Two of the pipes to be connected to the header are shown at 2—2. Thimbles 3—3 are secured in any preferred steam-tight manner in the wall, extending through it, the interior of the pipes communicating with the inside of the header through these thimbles. Each pipe has formed on it a collar 4 some distance from the end which is to communicate with the header. At the end of the pipe the material of the pipe is turned outward and back on itself for a certain distance, this turned-back portion being shown at 5. Instead of turning back the material of the pipe itself in the way indicated, a separate ferrule can be slipped on the end of the pipe and the two integrally connected at the end so that the resulting structure is the same as that made by the process described, a sleeve in each case surrounding the pipe near its end, the pipe and sleeve being integrally united adjacent to their ends. The outer or lower end of the turned-back portion 5 is chamfered so as to have a sharp edge spaced from the pipe itself as shown.

This ferrule or turned-back portion 5 fits closely into the downwardly extending collar 6 of thimble 3. The end of pipe 2 bears against a seat 7 in the thimble 3. The collar 6 is of such length as to bring its outer end as far below the header wall as the end of the turned-back portion 5. The collar is chamfered as shown in the figure in such a manner that it has a sharp edge juxtaposed to that of the turned-back portion 5.

There are shown in the figure two such pipe ends. The one at the left illustrates the parts as so far described, the assembly being incomplete. To complete it, the two sharp edges are welded together as shown at the right. The weld is preferably made with an oxy-acetylene torch, only the extreme edges being welded, as this weld is not intended for strength but is merely a seal. Other means are used for holding the pipe in engagement with seat 7. The means for this purpose preferred by me are those illustrated in the figure. A bolt 9 with a head 10 lying in the slot 11 extends through a clamp 12, this clamp has openings 13 through which the pipes 2—2 extend. On the clamp rest the two washers 14—14 which engage the annular abutments or collars 4—4. A nut 15 on the lower end of the bolt 9 pulls the clamp 12 and as a consequence the pipe ends 2—2 toward the header. The upper ends of the pipe ends are thereby pressed firmly against the seat 7—7. In the drawing the pipe ends are shown as spherical segments. This is not essential as I do not depend upon this joint for tightness. Tightness is provided entirely by the seal 8.

The assembly described can be dismantled and reassembled repeatedly. To dismantle it the seal 8 has to be broken. This is readily done by a comparatively slight scraping or filing along the edge. The two can be again welded together and the breaking welding can be repeated several times before the edge becomes worn away too much for further repetition of the process. The chamfering of the collar 6 and the turned-back portion 5 can then be repeated so that new sharp edges are presented. The dismantling and re-assembling can thus be repeated for a great many times.

The thimbles 3 are used when the material of the wall 1 is such that it cannot readily be welded to the material of the tube. This would be the case when the header is of cast iron. The thimble is made of steel of a composition to make it easily weldable to the pipe.

If the material of the header 1 is such that the collar 6 can be formed directly from it and can readily be welded to the pipe there will be no thimble and the collar will be unitary with the header.

Obviously variations can be made in the invention without departing from the spirit of the subjoined claims.

I claim:

1. In apparatus of the class described the combination of a metal wall having an aperture, a seat encircling one end of said aperture, a collar surrounding the seat and extending outward from the wall, a pipe, a sleeve encircling it, pipe and sleeve being integrally united around their circumference adjacent to their ends, said integrally united portions engaging said seat, the configuration of the parts being such that the outer ends of the collar and the sleeve are juxtaposed, said ends being welded together, and means to force the pipe and ferrule to the seat.

2. In apparatus of the class described the combination of a metal wall having an aperture, a seat encircling one end of the aperture, a collar surrounding the seat and extending outwardly from the wall, a pipe having its wall turned outward and back on itself for a certain distance at its end, the end of the pipe engaging the seat, the configuration of the parts being such that the outer ends of the collar and the turned-back portion of the pipe are juxtaposed, said ends being welded together, and means to force the pipe end to the seat.

3. Apparatus in accordance with claim 2, the turned-back portion and collar being oppositely chamfered to form sharp adjacent edges, the welding together of the two parts being along these edges.

4. In apparatus of the class described, the combination of a cast iron header, a nipple secured in said header, said nipple having a shouldered aperture through it and having a collar extending outwardly from the header, a pipe having its wall turned outward and back on itself for a certain distance at its end, the end of the pipe engaging said shoulder, the ends of the collar and turned back parts being chamfered to form sharp adjacent edges, the edges being welded together, and means to force the pipe end against the shoulder.

CHARLES H. TRUE.